INVENTOR
Walter E. Myles
BY *William Grobman*
ATTORNEY

April 15, 1969  W. E. MYLES  3,439,157
POINT LIGHT SOURCE
Filed Feb. 11, 1966  Sheet 2 of 2
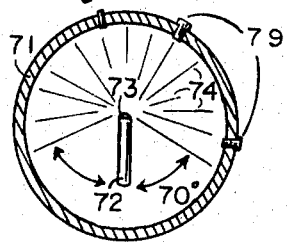
Fig. 7
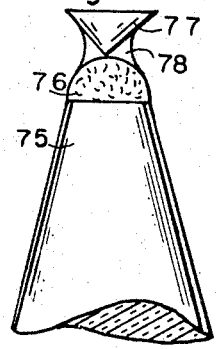
Fig. 8
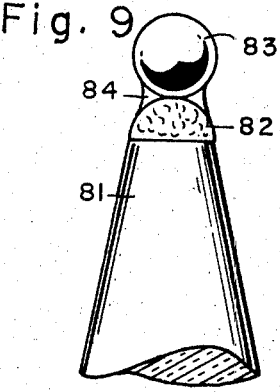
Fig. 9
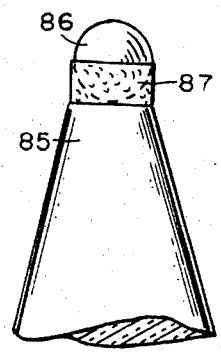
Fig. 10
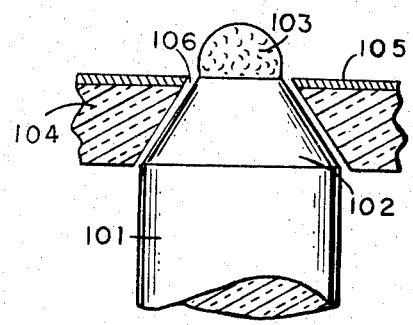
Fig. 11    Fig. 12
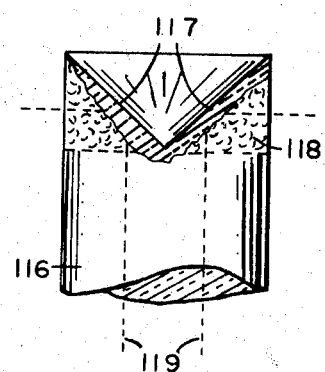
Fig. 13
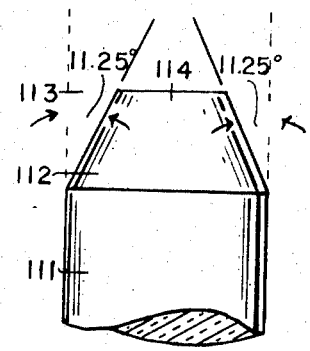
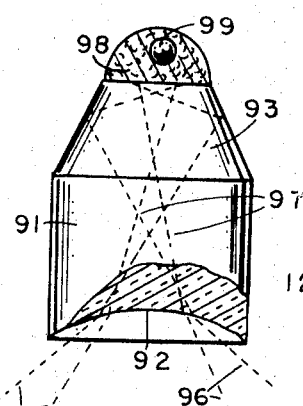
Fig. 14
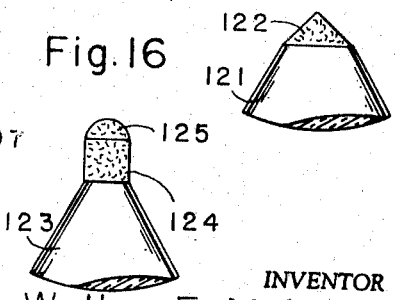
Fig. 15   Fig. 16
INVENTOR
Walter E. Myles
BY William Grobman
ATTORNEY

United States Patent Office 3,439,157
Patented Apr. 15, 1969

3,439,157
POINT LIGHT SOURCE
Walter E. Myles, Alexandria, Va., assignor to Singer-General Precision, Inc., Binghamton, N.Y., a corporation of Delaware
Filed Feb. 11, 1966, Ser. No. 526,858
Int. Cl. G02b 5/14
U.S. Cl. 240—1          23 Claims

ABSTRACT OF THE DISCLOSURE

A light conducting cylinder is polished to reduce the losses due to imperfections in its circumference. One end of the cylinder is tapered at an angle such that the critical angle is not exceeded to prevent loss of light through the taper until the end of the cylinder is the desired diameter. A light diffusing material such as finely divided aluminum oxide suspended in a frozen transparent substance such as water glass is mounted on the small diameter end of the cylinder. This device gathers light through a large area and radiates it through a small area to increase the radiation intensity.

---

This invention relates to light sources, and more particularly to apparatus for creating a point source of light.

Point sources of light are useful in many fields and, in the past, many light sources have been developed in efforts to achieve a point source. As with most things, when the size of the source was decreased, the amount of light emitted was correspondingly decreased. In the more recent past, arc lights utilizing gaseous atmospheres, such as krypton arc lights or mercury vapor lamps, have been developed in which the amount of light is surprisingly large for the size of the arc. In fact, lamps which use 75 to 100 watts of electrical power may have arcs which occupy a volume in the neighborhood of only about 0.0015" on a side. These are called point light sources in the art. Anything smaller than this would, of course, also be considered a point light source.

Although the sizes of the sources of light are gradually being decreased, there have been serious limitations in the light distribution patterns from these sources. It has not been easy to achieve an extremely small sized source of intense light which radiates light in a horizontal arc of 360°, and also in a vertical arc of more than about 90°. Further, the light distribution in these patterns has not been very uniform. There are usually some portions of the pattern where the light intensity is much greater than that in other portions. As a general rule, the light towards the center of the pattern is stronger than the light along the outer fringes. A clean, uniform light source of small size is still needed.

It is an object of this invention to provide a new and improved light source.

It is another object of this invention to provide a new and improved light source, particularly a point light source.

It is a further object of this invention to provide a new and improved point light source which has desired radiation characteristics in any of several different configurations.

It is still a further object of this invention to provide a new and improved source of light which is smaller than those heretofore constructed.

It is yet another object of this invention to provide new and improved sources of light having extremely small dimensions for radiating light in predeterminable patterns.

Other objects and advantages of this invention will become apparent as the following description proceeds, which description should be considered together with the accompanying drawings, in which:

FIGS. 5, 8, 9, 10, 11, 12, 14, 15 and 16 are side views of various embodiments of light sources of this invention;

Figure 6:
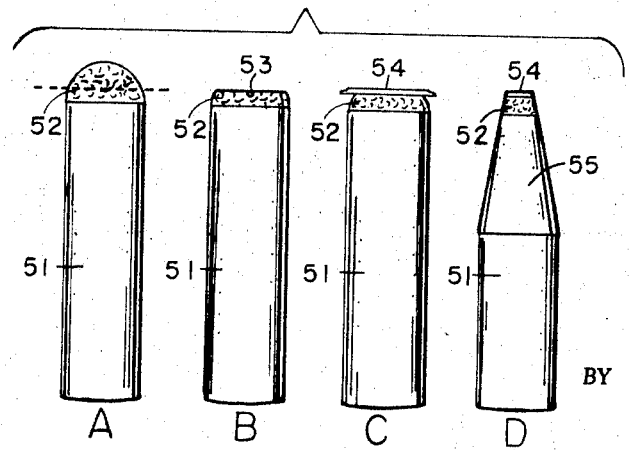

FIG. 6 comprises four views showing the steps in the manufacture of one type of source of light according to this invention;

FIG. 7 is a schematic sectional view of a spherical projection system containing a point light source; and FIG. 13 is a side view of a light pipe made in accordance with this invention.

Figure 1:
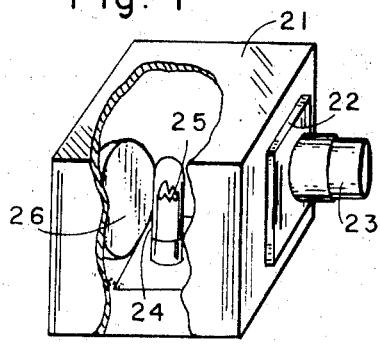
FIG. 1 is an isometric view, partially broken, of an image projector.

Referring now to the drawings in detail and more particularly to FIG. 1, the reference character 21 designates a projector housing which has mounted on one side a film holder 22 having a projection lens system 23 mounted thereon. Within the housing 21, shown by the cut-away portion, is a projection lamp 24 which has a filament 25. A reflector 26, which may be spherical, if desired, is mounted behind the lamp 24. This structure is a common prior art device.

In operation, the lamp 24 is energized until the filament 25 glows and emits light. The light from the filament 25 passes through the film contained in the film holder 22, and the image of the picture on the film is projected by the lens system 23 on any desirable surface, not shown. The reflector 26 helps collect light from the filament 25 which does not pass directly from the filament to the film. The ideal system would use a point light source. However, as shown in FIG. 1, the filament 25 is anything but a point, and light is emitted over the entire length and width of that filament. This tends to create uneven transmission of light from the filament 25.

Figure 2:
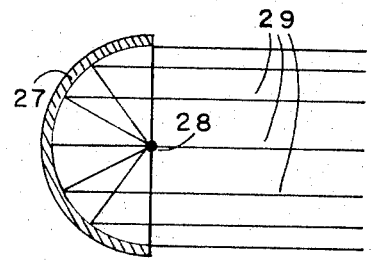
FIG. 2 is a schematic showing of a point source of light at the focus of a parabolic reflector.

In FIG. 1, the reflector 26 may be a spherical reflector or it may be a parabolic reflector. In FIG. 2, a parabolic reflector 27 is shown with a point light source 28 at its focus. The focus of a parabolic reflector is a point, and when the source of light 28 occupies that point, the light originating at the source 28 is reflected by the reflector 27 in parallel rays 29. As the source 28 deviates from the focus of the reflector 27, the angle at which the light is reflected by the reflector 27 changes, and the light emitted therefrom is no longer in parallel rays. When the source 28 of light is not a point but occupies a finite volume, some of the light originates from outside the focus, and there is a general scattering of the light reflected by the reflector 27. The larger the source of light 28, the greater the scattering. Thus, in most reflector systems, a cone of light rather than a cylinder of light is transmitted.

Figure 3:
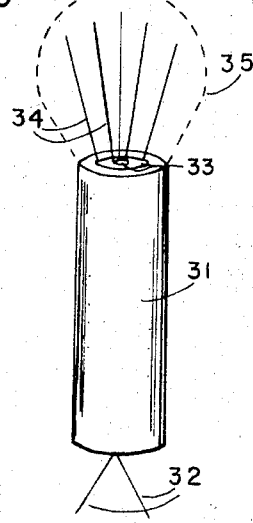
FIG. 3 is an elevational view of a light pipe serving as a source of light.

FIGS. 1 and 2 illustrate systems in which point light sources are considered desirable. FIG. 3 illustrates an early developed point light source. A cylindrical light pipe 31 made of any suitable optical material having a high index of refraction has light 32 introduced into it at one end. The light emerges from the other end of the light pipe 31 in what appears to be a plurality of concentric rings 33, each of which represents diverging light rays 34. See "Concepts of Classical Optics," by John Strong, published by W. H. Freeman and Co. of San Francisco, in 1958, pp. 558 and 579. The general distribution of light is shown by the pattern 35. The light from the light source, not shown, which enters the light pipe 31 parallel to its axis, passes through the light pipe 31 and emerges from the other end unmodified. Light rays 32 which enter the light pipe 31 at an angle pass through the light pipe until they strike a wall of the pipe. So long as the angle of incidence is less than the critical angle of the substance from which the light pipe is made, the light striking the surface is reflected internally at an angle from the surface which is equal to the angle of incidence with the surface. Light, which bounces once off the internal surface of the light pipe 31, appears to emerge at the end as an internal ring of light concentric with the axis of the pipe 31. Light 32, which enters the light pipe 31 at an angle sufficient to receive two reflections before it emerges, appears to emerge as a next outer concentric ring. Obviously, if a point source of light which is comparatively uniform is desired, the light pipe shown in FIG. 3 is not suitable. Better distribution of the light can be achieved by producing a haze on the end surface of the pipe 31 which emits the light. This, then, causes the light which emerges from the end surface as concentric rings to be somewhat more diffused, and the boundaries of the rings begin to merge and lose their identities. However, this type of a light source has serious limitations, particularly since the divergent angle of the usable light emitted is fairly narrow, seldom more than 90°.

Although there are many, many materials which may be used as light pipes, some are more suitable for particular purposes than others. Some of the acrylic resins are clear and transmit light readily. Since they also have a fairly large index of refraction, there is substantial internal reflection, and they serve admirably as light pipes to conduct light from a source to a point where it is readily utilized. Since the acrylic resins are also flexible in smaller diameters, they may be readily formed or bent into desirable shapes to conduct light around obstructing objects. This is true of many of the transparent synthetic resins. In addition to the synthetic resins, the clear glasses also serve as light conduits to conduct light from one point to another by internal refraction. One of the best glasses for this purpose is the form of aluminum oxide ($Al_2O_3$) known as sapphire, and in particular, the optically clear sapphire. This material, often synthetically formed, is readily available commercially in cylindrical rods, a standard size for example being .060″ in diameter. Sapphire rods have the advantageous characteristics of a very high index of refraction and very low light absorption. In fact, an optically clear sapphire rod will transmit almost 100% of the light applied at one end. It has been found that a large part of the loss of light in light pipes is due to transmission of the light through the side walls of the pipe, rather than by absorption, particularly when there are flaws in the pipe side walls and when the pipes are tapered. This occurs when the angle of incidence of the light ray against the inside wall of the pipe exceeds the critical angle. In that case, the light will not again be reflected but will pass out into the surrounding air. This plays an important role in the development of light pipes for use as point sources of light.

Figure 4:
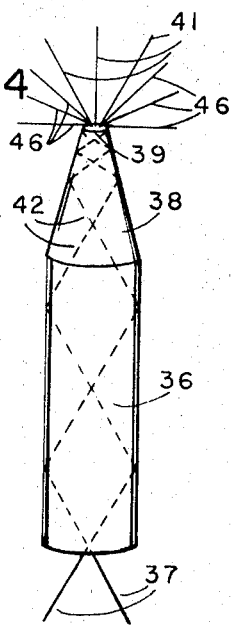
FIG. 4 shows one embodiment of the light source of this invention.

In FIG. 4, a light pipe 36 having light rays 37 applied at one end has a tapered portion 38 at its other end. The tapered portion 38 ends in a flat portion 39 from which light rays 41 and 46 are emitted. The light rays 37 applied at one end of the light pipe 36 are shown internally reflected as rays 42.

A point source of light is, by definition, a source of light which is very small. Since there are practical limitations to the smallest diameter pipe 36 which can readily be made and handled, it is often desirable to reduce the diameter of that end of the pipe 36 which emits the light below that of the rest of the pipe. The easiest way to accomplish this is to grind the pipe 36 along a portion or all of its length on an angle to form a truncated cone 38. See for further comments, Technical Report NAVTRA-DEVCEN 1628-1, "Study of Point Light Source Projection System Components," published by U.S. Naval Training Device Center, Port Washington, N.Y., March 1959, pp. 75–80. As mentioned above, present arc lights have generated arcs which are in the neighborhood of 0.015″ on a side. It is desirable to reduce the source of light below this size. Using a large diameter pipe 36, which is tapered at 38 to arrive at the desirable size of the flat portion 39, has the added advantage of providing a comparatively large diameter surface to which light from an external source can be applied. As shown in FIG. 4 by the lines 42, successive reflections of the light beams within the tapered portion 38 of the pipe 36 gradually increase the angle of incidence of the light rays 42 with the surface of the pipe 36, as shown by the emerging rays 41 which are the same as the rays 34 of FIG. 4. In addition, the taper produces a second set of rays 46 which are more divergent. This has one advantage in providing a wider divergent angle of light at the flat surface 39, but has the added disadvantage of tending to increase the amount of light which escapes through the side walls of the light pipe in the tapered portion 38. Since, with each reflection of the light beam 42, the angle of incidence with the surface of the taper 38 increases, a compromise must be reached between the amount of diameter reduction required and the length of the tapered portion 38, so that the number of internal reflections is limited and yet the small diameter end surface 39 is achieved. However, in the embodiment shown in FIG. 4, the light emerging from the flat surface 39 still appears to emerge as concentric circles and does not have a uniform pattern.

Figure 5:
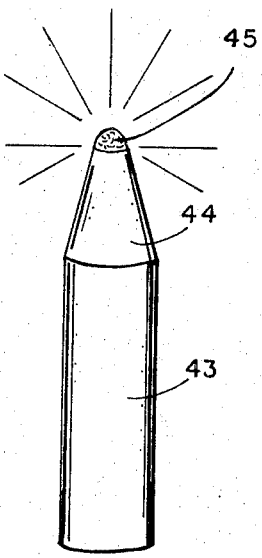

Modification of the light pipe of FIG. 4 is shown in FIG. 5. A light pipe 43 has a tapered portion 44. The end of the tapered portion 44 is a flat surface the same as the flat surface 39 of FIG. 4. A hemispherical re-emitter 45 caps the flat surface of the tapered portion 44. The re-emitter 45 is made of a diffusing substance so that the light emitted from the portion 45 is substantially uniform in characteristic.

In operation, light passes through the pipe portion 43 and the tapered portion 44 as discussed earlier and, in particular, as discussed in connection with FIG. 4. At the end surface of the tapered portion 44 the light appears to emerge in concentric rings as mentioned above. The light which radiates as concentric rings passes into the diffusing medium of the re-emitter 45 and is so thoroughly diffused therein that the entire re-emitter 45 glows and emits light in a substantially uniform pattern. Preferably, the re-emitter 45 should be hemispherical in shape. This will provide light radiation through a horizontal angle of 360° and a vertical angle of approximately 180°. In addition, the re-emitter 45 should be substantially uniform so that the light emitted therefrom does not contain "hot spots." A device such as shown in FIG. 5 serves quite well as a light source, and if the diameter of the end of the taper 44 is in the order of 8 to 10 mils, then the source can really be considered a point light source. Since the re-emitter 45 is most desirable as a hemisphere, it can be applied to the end of the taper 44 in liquid form where the skin effect of the liquid will pull the substance into a hemispherical shape automatically. One substance which has been found to serve very satisfactorily as a re-emitter is a suspension of aluminum oxide dust (optical polishing powder) in water glass (sodium silicate solution). The sapphire dust, or aluminum oxide, absorbs little of the light emitted from the end of the taper 44, and the water glass also absorbs very little. However, the scattering effect of the alumina dust suspended in the water glass creates a really random distribution of the light and tends to convert the light from the concentric ring pattern, as the light emerges from the end of the taper 44, into a substantially uniform distribution over the complete hemisphere. The re-emitter 45 really glows.

The basic light pipe shown in FIG. 5 can be modified in a large number of ways to create what amounts to point light sources having specialized and specific radiation patterns. For example, FIG. 6 illustrates four separate steps in the creation of a point light source which has an annular shaped radiation pattern. FIG. 6A shows a cylindrical light pipe 51 with a diffusing hemisphere 52 mounted on one end thereof. In FIG. 6B, a top portion of the diffusing hemisphere 52 has been removed, such as by grinding or cutting, to form a flat surface 53. In FIG. 6C, a piece of metallic foil 54, such as aluminum foil, has been fastened as by gluing or any suitable way to the flat surface 53 of the diffusing hemisphere 52 which is mounted on the end of the pipe 51. In order to produce an operative light source which can be called a point light source and which has a radiation characteristic in the form of an annulus, a portion of the light pipe 51 is tapered at 55 to produce a truncated cone. The light diffusing portion 52 and the metal foil 54 are also ground along the same lines as the rod 51. When light from a source which is not shown is applied to the large end of the light pipe 51, it passes through the pipe until it reaches the other end. There the light emerges as concentric rings, as explained above in connection with FIG. 3, and leaves the pipe 51 to enter the diffusing material 52. If, as mentioned above, the diffusing material 52 is in the order of powdered alumina suspended in a carrier such as water glass, then the light from the end of the pipe 51 is continually re-reflected by the alumina particles until it finally is emitted. That light which passes through the diffusing material 52 and strikes the under-surface of the foil 54 will be reflected back. Thus, the foil 54 casts a shadow in an axial direction. The light emitted from the diffusing material 52 forms a ring having a thickness which depends to some extent on the amount of taper and the thickness of the diffusing material 52, and which may be in the order of a 90° span. From the above, it can be seen that tapered light pipes having diffusing tips may be used as sources of light in many applications.

FIG. 7 shows a spherical shell 71 which contains large numbers of perforations having projection lenses and, possibly, transparent photographic film (not shown). These devices are called planetariums and comprise one type of image generator. A source contained in the center of the shell 71 provides light for the lens systems shown at 79 including those which may contain photographic transparencies. For this purpose, a source, which is maintained in the proper orientation regardless of the rotation of the shell 71, is essentially a point source which has a uniform radiation pattern, and which emits a sufficient amount of light to serve the desired purpose. Shown in position in the shell 71 is a light pipe 72 having a radiant tip 73 which emits light, shown in FIG. 7, as light rays 74. As shown here, the vertical angle of the radiation pattern from the tip 73 is about 220° and the horizontal radiation pattern is 360°. Although not shown in FIG. 7, light sources of this type are ordinarily mounted on gimbal rings and are weighted so that they maintain the same attitude even though the housing 71 may be rotated. For some uses, it may be desirable to provide a light source 73 in the housing 71 for radiation only in a band of about 90° around the equator of the housing 71. The device of FIG. 6 illustrates one way in which this may be accomplished. The devices of FIGS. 8, 9 and 10 illustrate other ways.

In FIG. 8, a tapered light pipe 75 has a diffusing hemisphere mounted on its small diameter end. A polished metallic cone 77 is mounted on its apex on the hemisphere 76 and is held in place by a suitable adhesive 78.

The operation of this device is very similar to the operation of the device shown in FIG. 6. The light is applied to the large diameter end of the pipe 75 and is transmitted therethrough to its small diameter end where it emerges in the form of concentric circles. This light is passed into the diffusing hemisphere 76 where it is reflected in a random fashion a sufficient number of times by means of the powdered alumina contained therein to develop a substantially uniform radiation characteristic. Some of the light emitted by the diffusing hemisphere 76 passes upwardly and strikes the surface of the cone 77. This light is reflected downwardly and outwardly, extending the radiation pattern of the diffuser 76 downwardly. However, the cone 77 casts a shadow upwardly, and the end result is a wide ring of light emitted from the tip 76.

In FIGS. 9 and 10, highly polished metallic balls are substituted for the cone 77. In FIG. 9, the small end of tapered light pipe 81 is covered by a diffusing hemisphere 82. A small polished metallic ball 83 having a diameter similar to the diameter of the diffusing material 82 is mounted on the end of the hemisphere 82 and is held in position by a suitable adhesive 84 such as clear water glass. Light passing through the pipe 84 emerges at the small end of the pipe 81 in the form of concentric circles and passes into the diffusing hemisphere 82. There it is repeatedly reflected until it finally emerges. Light passing upwardly from the hemisphere 82 strikes the metallic ball 83 and is reflected to strength the radiation pattern downwardly. In FIG. 10, the small end of a tapered light pipe 85 has a metallic ball 86 mounted directly thereon. The space between the end of the pipe 85 and the lower half of the metallic ball 86 is occupied by a diffusing medium 87 which may be the powdered alumina-water glass mixture mentioned above. Light emerging from the end of the pipe 85 as concentric circles passes into the diffusing medium 87 and is reflected from the outside of the metallic ball 86. If the diameter of the ball 86 is less than the diameter of the end of the pipe 86, the light reflected from the ball 86 also passes through the diffusing medium 87 to create a more even distribution or radiation pattern of light. Again, a shadow in the upward direction is cast by the ball 86.

One form of the invention which creates a substantially uniform radiation pattern of light over a horizontal angle of 360° and a vertical angle of 180° is shown in FIG. 11 as a cylindrical light pipe 101 made of any suitable material as discussed above having a tapered portion 102 which ends in a flat portion having a diameter smaller than the diameter at the other end of the pipe 101. A hemisphere 103 of diffusing material such as that discussed above is mounted or otherwise attached on the flat end of the taper 102. A mirror having a base 104 which is glass, plastic, or similar construction material, and a highly reflective metallic covering 105 is mounted such that the hemisphere 103 passes through a perforation 106 in the mirror 104. In operation, light is applied to the large diameter end of the pipe 101 and is transmitted through the pipe 101 to the conical section 102 where transmission of the light continues, partially direct and partially by internal reflection, to emerge in the form of concentric rings from the flat end of the taper 102. The light emerging from the flat end of the taper 102 passes into diffusing material 103 and is randomly reflected therein to create a uniform distribution of light therefrom. Light passing from the diffusing material 103 in a direction toward the side portion of the pipe 101 is reflected back by the mirror 104. This type of structure serves a particular purpose. Even when a flat diffusing material 103 such as that described above is used, the light which is radiated in an axial direction from the diffusing tip 103 tends to be a bit brighter or of higher intensity than the light which is emitted from those areas adjacent the interface between the tapered portion 102 and the hemisphere 103. The use of the mirror 105 tends to limit the vertical radiation pattern to one of 180° and also serves to strengthen the amount of light radiated from the interface portion. Thus, not only is the radiation pattern limited to the vertical angle of 180°, but the uniformity of the light distribution is improved by the embodiment shown in FIG. 11.

A slightly different modification of a light pipe used as a light source is shown in FIG. 12. In this case, a cylindrical light pipe 116 has a conical identation 117 made in its end. Preferably, the apex angle of the cone 117 should be about 90°. The outer surface 118 of the end of the pipe 116 in which the conical cavity 117 is impressed is ground or otherwise has a haze applied to it so that it serves as a diffusing surface. This structure serves as a source of a cylindrical band of light of good intensity, but it cannot be called a point light source. Light rays 119 passing through the cylindrical light pipe 116 strike the inner surface of the cone 117 and are reflected outward substantially at right angles to the surface of the pipe 116. Since the light would generally be reflected from the inner surface of the cone 117 as concentric circles, the diffusion surface 118 is necessary to render radiation from this type of source more uniform. This type of source generally emits a fairly narrow band of light having a horizontal angle of 360°.

In using light pipes to serve as point sources of light, compromise must be made between two opposing desirable conditions. It is desirable to use a light pipe having a comparatively large diameter at its light receiving end so that as much light as possible can be introduced into the pipe. On the other hand, it is desirable to have the emitting end of the pipe of small diameter so that it most nearly approaches a point source. These two desirable features have been incorporated into a single source in the various embodiments discussed above by tapering a portion of the light pipe to form a truncated cone in which the diameter of the base of the cone is the diameter of the pipe itself. The diameter of the truncated portion at the top of the cone is the diameter of the point source. It has been found that standard sapphire light pipes having diameters in the order of 0.060″ and 0.040″ are suitable as a starting point for point light sources. A portion or all of the pipe is then conically ground until the diameter of the small end reaches the desired size. Here again, compromise must be reached. The amount of taper can be large or it can be small. As mentioned above in connection with FIG. 4, light rays passing through the light pipe strike the tapered portion at a greater angle than they strike the cylindrical portion. If the tapered portion is long, the light rays may be repeatedly reflected from the inside wall of the taper. At each reflection, the angle of incidence of the light ray becomes larger. Should the angl of incidence become greater than the critical angle, reflection does not take place and the light passes out through the side walls of the taper and is lost. Thus, if a shallow taper which results in a long tapered portion is used, there is the possibility that repeated internal reflection will cause the loss of a substantial amount of light through the side walls of the pipe. On the other hand, if the taper is made very steep, then the angle of incidence on the first "bounce" may exceed the critical angle, and light may be lost in that manner. For these reasons, an intermediate angle of taper should be selected. One desirable angle is shown in FIG. 13 where a cylindrical light pipe 111 has a tapered portion 112 ending in a flat surface 114. The angle of taper 113 is shown in this case to be 11.25° and is the angle formed between a continuation of the cylindrical portion 111 and the cone 112. The size of the angle designated there is merely an example of one angle of taper which has been found to be quite suitable when using sapphire and with the amount of reduction in diameter desired. Other angles of taper which satisfy the particular conditions of a slightly different situation may, of course, be used. For example, when a negative lens is used at the entrance end of a pipe, the angle of taper may be as small as 1°–5°.

A desirable point source for light is shown in FIG. 14 in which a tubular light pipe 91 has a tapered portion 93. The large end of the pipe 91 has formed therein a negative spherical lens 92. A diffusing hemisphere 98 formed, for example, of the powdered alumina-water glass mixture mentioned above is mounted on the small diameter end of the tapered portion 93. A small metal ball 99 is suspended in the hemisphere 98 at a point somewhat remote from the end of the tapered portion 93. Light rays 96 enter the large diameter end of the pipe 91 at the negative lens 92 and are bent thereby more nearly parallel to the axis of the cylinder 91 as shown at 97 to reduce the amount of internal reflection in the tapered portion 93. Thus, by using a negative lens 92 at the input end of the light pipe 91, the amount of light lost by penetration through the side walls of the light pipe is reduced. As indicated above, the light which reaches the small diameter end of the tapered portion 93 emerges as concentric rings therefrom, and this light passes into the diffusing hemisphere 98 where it is randomly reflected to improve the uniformity of the light radiating therefrom. As mentioned above, even when a highly diffusive material such as the alumina-water glass mixture is used, the radiation pattern of the light given off from this hemisphere is not completely uniform. There is more light radiated axially than there is laterally. The small steel ball 99 which is suspended in the hemisphere 98 and which is surrounded by diffusing material serves to reflect some of the light back toward the light pipe 91 and to block some of the light which would be radiated axially. This renders the radiation pattern for the hemisphere 98 more uniform by reducing the axial radiation slightly and increasing the lateral radiation somewhat. The radiation pattern from a source such as that shown in FIG. 12 has a horizontal coverage of 360° and may have a vertical coverage of 250° or thereabouts. If the diffusing material 98 were bulged out somewhat so that the diameter of the diffusing material 98 exceeded the diameter of the small end of the tapered portion 93, then the vertical angle of radiation of light from a source of this type could be increased substantially and would be limited only by the shadow cast by the light pipe 91 itself. However, in a situation of this type, a compromise must be reached between a desirable small diameter for the source and the required vertical angle of the light radiation.

In FIG. 15, a further modification of a point source of light is shown. In this case, the cylindrical light pipe is ground along a taper 121 of a suitable angle such as 11°. Then, when the end of the taper has reached a desired diameter, the tip of the tapered portion 122 is further ground along a steeper angle. As a finishing touch, the outer surface of the steep cone portion 122 is hazed by any suitable means. Light entering the cylindrical portion of the pipe, not shown, is transmitted along the pipe and along the tapered portion 121 as described earlier. When, however, the light reaches the portion 122 which is ground at a steeper angle, the angle at which the light strikes the walls of the portion 122 is greater than the critical angle of the material, and the light emerges all along the portion 122. To obtain better light distribution, the surface of the radiating portion 122 is hazed to diffuse the light. The main objection to this type of light source is its lack of uniformity of light distribution. There is not sufficient reflection of the light in a random manner, and the light, when it is projected onto a surface, still shows the concentric rings of varying intensity.

Another form of the light pipe with the glowing end is shown in FIG. 16. In this embodiment, a cylindrical light pipe has a portion of its end ground along a suitable taper 123. When the end of the tapered portion 123 has been ground to the desired diameter, a cylinder 124 of diffusing material such as the alumina-water glass suspension mentioned above is applied thereto. The end of the cylinder 124 is then topped by a hemisphere 125 of the diffusing mixture. The end result of the structure shown in FIG. 16 is a point light source in which both the cylinder 124 and the hemisphere 125 glow with the emergence of light which has been repeatedly reflected therein. The general distribution of the light emitted by this source has the shape of a wide ring topped by a hemisphere. Because of the wider lateral radiation of light, the overall light distribution is improved.

The use of the negative lens 92 in the input end of the light pipe 91 has been discussed above. A successful light source may also be made by providing a cylindrical light pipe with a negative lens at both ends. The negative lens at the input end would tend to straighten the light rays passing through the cylinder and make them more nearly parallel to the axis itself, and the negative lens at the radiation end tends to concentrate the light towards the center of the lens and to create a divergent light pattern. Less light is lost by radiation through the sides of the light pipe and most of the light is concentrated at a comparatively small diameter spot at the center of the emitting end of the pipe. However, the angle of radiation of this type of source is quite narrow and has limited uses.

This specification has described and illustrated a new and improved light source which serves as a point source of light, which is efficient and which can readily be made to have any of a large number of desirable radiation patterns. The above specification has also described some desirable materials for this purpose and many configurations which the invention may take. It is realized that the above disclosure may indicate to others in the art additional ways in which the principles of this invention may be utilized without departing from its spirit. It is, therefore, intended that this invention be limited only by the scope of the appended claims.

What is claimed is:

1. A point source of light comprising a generally cylindrical member made of an optionally clear material having a high index of refraction, one end of said member having a first face which is of a first diameter, at least a portion of said member being tapered to form at the other end a second end face of a second diameter which is smaller than said first diameter; and a lump of highly light diffusive material mounted on said second face, said member being adapted to receive light applied at said first face and transmit said light to said second face where it emerges into said lump of diffusive material which diffuses the light emitted from said second face to create a substantially uniform source of illumination.

2. The point light source defined in claim 1 wherein said member comprises a light pipe for transmitting light by internal reflection from one end to the other.

3. The point light source defined in claim 1 wherein said tapered portion is tapered at an angle which causes reduction of the diameter of said member from said first diameter to said second diameter without causing internally reflected light to exceed the critical angle of said material in said tapered portion.

4. The point light source defined in claim 1 wherein said lump of diffusing material comprises a dispersion of a highly reflective comminuted material in a clear carrier whereby light entering said carrier is repeatedly and randomly reflected by said dispersion.

5. The point light source defined in claim 4 wherein said first face comprises a negative lens formed in said one end to refract light entering said one end at an angle more nearly parallel to the longitudinal axis of said member.

6. The point light source defined in claim 4 further including a light reflective member mounted on said lump to reflect light from the said lump back toward said member to create a generally annular distribution of radiation.

7. The point light source defined in claim 6 wherein said light reflective member is opaque.

8. The point light source defined in claim 6 wherein said reflective member comprises an inverted cone.

9. The point light source defined in claim 6 wherein said reflective member comprises a ball.

10. The point light source defined in claim 3 further including a light reflective member mounted on said lump to reflect light from the said lump back toward said member to create a generally annular distribution of radiation.

11. The point light source defined in claim 10 wherein said light reflective member is opaque.

12. The point light source defined in claim 10 wherein said reflective member comprises an inverted cone.

13. The point light source defined in claim 10 wherein said reflective member comprises a ball.

14. The point light source defined in claim 4 wherein said comminuted material comprises powdered alumina and wherein said clear carrier comprises a hardened amorphous substance such as sodium silicate.

15. The point light source defined in claim 1 wherein said lump comprises a hemisphere of said diffusive material, the radius of said hemisphere being substantially equal to one-half of said second diameter whereby light being emitted from said lump forms a substantially uniform pattern spanning a horizontal angle of 360° and a vertical angle of at least 180°.

16. The point light source defined in claim 15 wherein said first face comprises a negative lens formed in said first end of said member to cause light entering said first end at an angle to become more nearly parallel to the longitudinal axis of said member and thereby reduce the number of internal reflections.

17. The point light source defined in claim 15 further including a small highly reflective device embedded in said hemisphere generally along the longitudinal axis of said member and adjacent the outer surface of said member to reduce the relative intensity of the light being emitted along the longitudinal axis of said member.

18. The point light source defined in claim 16 further including a small highly reflective device embedded in said hemisphere generally along the longitudinal axis of said member and adjacent the outer surface of said member to reduce the relative intensity of the light being emitted along the longitudinal axis of said member.

19. The point light source defined in claim 15 further including a plain mirror surrounding said member with its reflecting surface adjacent the junction between said hemisphere and said second face to provide a light pattern having a vertical angle of distribution which cuts off sharply at 180°.

20. The point light source defined in claim 1 wherein said lump of diffusive material comprises a cylindrical portion mounted on said second face and having a diameter substantially equal to said second diameter and a hemisphere mounted upon the end of said cylindrical portion, the radius of said hemisphere being substantially equal to one-half of said second diameter.

21. The point light source defined in claim 1 wherein said lump of diffusive material comprises a generally cylindrical portion mounted on said second face and having a diameter substantially equal to said second diameter, and including a highly reflective spherical device having a diameter somewhat smaller than said second diameter, said spherical device being embedded in said cylindrical portion.

22. A point light source comprising a generally cylindrical member made of an optically clear, highly refractive material having low light absorption; a negative lens formed as a first face on one end of said cylindrical mmeber; at least a portion of said cylindrical member remote from said first face being tapered to form a second face which has a smaller diameter than said first face; said member being adopted to receive light at said first face and to bend light so received more generally parallel to the longitudinal axis of said member and to transmit said light by internal reflection to said second face where it emerges; the angle at which said portion is tapered being such that the diameter of said member is reduced from the diameter of said first face to the diameter of said second face without causing light being internally reflected from said tapered portion to exceed the critical angle of the said material; and a piece of highly diffusive material mounted on said second face to so diffuse the light being emitted therefrom as to create a source of radiation having a generally uniform pattern of distribution.

23. A point light source comprising a small, intensely radiant element; a generally cylindrical member formed of an optically clear, highly refractive, low absorptive material; said member having a first face of a first diameter; at least a portion of said member being tapered to form a second face of a second diameter which is smaller than said first diameter; said taper being at an angle such that light reflected from the inside walls of said taper does not exceed the critical angle of said material; said radiant element being mounted on said second face and comprising a dispersion of a triturated reflective substance in a clear carrier; said member being adapted to receive light at its first face and to transmit said light without appreciable loss to said second face where it emerges into said radiant element to radiate light in a substantially uniform pattern.

References Cited

UNITED STATES PATENTS

| | | | |
|---|---|---|---|
| 1,351,562 | 8/1920 | Foster | 240—1 |
| 1,794,557 | 3/1931 | Symonds | 350—96 |
| 2,408,601 | 10/1946 | Blauwelt | 240—646 |
| 2,636,109 | 4/1953 | Cone | 240—1 |
| 2,760,185 | 8/1956 | Held | 240—1 |
| 2,942,099 | 6/1960 | Goldstein | 350—96 |
| 3,213,751 | 10/1965 | Benjamin et al. | 240—106 |

FOREIGN PATENTS 205,598   1/1957   Australia.

NORTON ANSHER, *Primary Examiner.*

RICHARD M. SHEER, *Assistant Examiner.*

U.S. Cl. X.R.

350—96